(12) United States Patent
Wang et al.

(10) Patent No.: US 8,952,996 B2
(45) Date of Patent: Feb. 10, 2015

(54) IMAGE DISPLAY SYSTEM

(75) Inventors: Yeong-Feng Wang, Taoyuan Hsien (TW); Ming-Wei Tsai, Taoyuan Hsien (TW); Keh-Su Chang, Taoyuan Hsien (TW); Rong-Chang Liang, Cupertino, CA (US)

(73) Assignee: Delta Electronics, Inc., Taoyuan Hsien (TW)

( * ) Notice: Subject to any disclaimer, the term of this patent is extended or adjusted under 35 U.S.C. 154(b) by 557 days.

(21) Appl. No.: 13/246,088

(22) Filed: Sep. 27, 2011

(65) Prior Publication Data

US 2013/0076798 A1    Mar. 28, 2013

(51) Int. Cl.
*G09G 5/10* (2006.01)
*G09G 3/00* (2006.01)
*G02F 1/13* (2006.01)
*G02F 1/1347* (2006.01)
*G02B 27/22* (2006.01)
*G09G 3/20* (2006.01)
*H04N 13/04* (2006.01)

(52) U.S. Cl.
CPC .............. *G09G 3/003* (2013.01); *G02F 1/1323* (2013.01); *G02F 1/13471* (2013.01); *G02B 27/2228* (2013.01); *G09G 3/20* (2013.01); *H04N 13/0402* (2013.01); *H04N 13/042* (2013.01); *H04N 13/0477* (2013.01); *G09G 2340/0457* (2013.01); *G09G 2340/14* (2013.01); *G09G 2354/00* (2013.01)
USPC ........................................................ 345/690

(58) Field of Classification Search
None
See application file for complete search history.

(56) References Cited

U.S. PATENT DOCUMENTS

| | | | |
|---|---|---|---|
| 7,834,903 B2 | 11/2010 | Saishu et al. | |
| 2006/0158729 A1* | 7/2006 | Vissenberg et al. | 359/462 |
| 2007/0096125 A1* | 5/2007 | Vogel et al. | 257/89 |
| 2007/0222703 A1* | 9/2007 | Sugihara et al. | 345/4 |
| 2008/0068329 A1* | 3/2008 | Shestak et al. | 345/102 |
| 2008/0123182 A1* | 5/2008 | Cernasov | 359/359 |
| 2010/0103168 A1* | 4/2010 | Jung et al. | 345/419 |
| 2010/0157026 A1* | 6/2010 | Reichelt | 348/51 |
| 2010/0253615 A1* | 10/2010 | Han et al. | 345/102 |
| 2011/0316764 A1* | 12/2011 | Parry-Jones et al. | 345/60 |
| 2012/0120203 A1* | 5/2012 | Chen et al. | 348/51 |

FOREIGN PATENT DOCUMENTS

JP    2007179059 A    7/2007

* cited by examiner

*Primary Examiner* — Nicholas Lee
(74) *Attorney, Agent, or Firm* — Muncy, Geissler, Olds & Lowe, P.C.

(57) ABSTRACT

Disclosed is an image display system for multi-viewing, including a display device for displaying right-eye images and left-eye images. A system controller is electrically connected to the display device and a light modulating device. A motion sensor, in response to a control signal from the system controller, is utilized for determining the positions of the eyes of a viewer. A processor, in response to one or more image signals from the motion sensor, provides the system controller with the positions. The light modulating device is utilized for spatially or angularly deflecting the right-eye images to the right eye of the viewer and for spatially or angularly deflecting the left-eye images to the left eye of the viewer in accordance with the positions.

8 Claims, 31 Drawing Sheets

0%

0% < T < 100%

100%

IMAGE DISPLAY SYSTEM

BACKGROUND OF THE INVENTION

1. Field of the Invention

The present invention relates to a 3D image display system for multi-viewing, and in particular relates to a display mode of a 3D image display system for multi-viewing.

2. Description of the Related Art

The conventional 3D image display technology utilizes shutter, polarizing light, lenticular lens, or fixed grating to control right and left eye images received by a right and left eye of a viewer, respectively. The right eye images and the left eye images are combined in the brain of the viewer for 3D image effect.

As shown in FIGS. 1A and 1B, a screen 12 displays a right eye image and a left eye image having a distance s therebetween. Because the eye distance Pd1 of a child in FIG. 1A is shorter than the eye distance Pd2 of an adult in FIG. 1B, the 3D image seen by the child will have a longer distance d1 than the distance d2 of the 3D image seen by the adult. In other words, the child easily feels dizzy or gets sick such as having acute concomitant strabismus due to improper 3D images. The conventional 3D image displays are designed on the basis of an average eye distance, an average watching angle, and an average watching distance of adults. The conventional 3D image displays cannot modify the 3D images corresponding to watching distances and watching angles of different ages, genders, and/or races, such that the viewers viewing the conventional 3D image displays may easily feel uncomfortable.

In Japan Patent Publication No. 2007-179059, a mobile naked-eye type 3D image display is disclosed, which includes a display panel, a light guide plate, two side light sources, and an optical film. The two side light sources are alternately turned on/off, and right eye images and left eye images are alternately outputted by the display panel. As such, the viewer at a specific position may see 3D images. Accordingly, the 3D image display cannot modify 3D images corresponding to positions of the viewers, eye positions of the viewers, a distance between the viewers and the display panel, and distances between the eyes of the viewers.

In U.S. Pat. No. 7,834,903, a naked-eye type 3D image display is disclosed, which includes a display panel and a lenticular lens structure. The display panel includes vertically arranged sub-pixels of red, green, and blue. The lenticular lens is parallel arranged in a period of 9 n times the number of the sub-pixels, wherein n is an integral. The screen can be divided to display nine 3D images for nine positions. However, the resolution of the 3D images is sacrificed, and viewers need to locate the specific positions to see 3D images. Accordingly, the 3D image display cannot modify 3D images corresponding to positions of the viewers, eye positions of the viewers, distances between the viewers and the display panel, and distances between the eyes of the viewers.

BRIEF SUMMARY OF THE INVENTION

One embodiment of the disclosure provides an image display system for multi-viewing, comprising: a display device for displaying right-eye images and left-eye images; a system controller is electrically connected to the display device and a light modulating device; a light modulating device electrically connected with the system controller; a motion sensor, in response to a control signal from the system controller, for determining the positions of the eyes of a viewer; and a processor, in response to one or more image signals from the motion sensor, for providing the system controller with the positions; wherein the light modulating device is adapted for spatially or angularly deflecting the right-eye images to the right eye of the viewer and for spatially or angularly deflecting the left-eye images to the left eye of the viewer in accordance with the positions.

One embodiment of the disclosure provides an image display device, comprising: a light source; and a light modulating device comprising a light modulating medium for spatially or angularly directing light emitting from the light source, wherein the light modulating medium is deformable and colored.

One embodiment of the disclosure provides an image display cell, comprising: a top substrate; a bottom substrate; a first light modulating device; and a second light modulating device capable of spatially or angularly directing light emitting from a light source, wherein the first and second light modulating devices are interposed between the top and bottom substrates.

One embodiment of the disclosure provides an image display device comprising a plurality of the described display cells.

One embodiment of the disclosure provides a light modulating device, comprising: a plurality of electronically switchable light modulating cells capable of spatially or angularly directing light emitting from a light source; and a plurality of color filter units, wherein each electronically switchable light modulating cell corresponds to one or more color filter units.

One embodiment of the disclosure provides an image display system, comprising: a display device for providing right-eye images and left-eye images; an optical means for modulating light beams associated with the right-eye images and light beams associated with the left-eye images to form substantially collimated light beams; and a light modulating device disposed adjacent to the display device, for spatially or angularly directing the substantially collimated right-eye light beams to the right eye of a viewer and spatially or angularly directing the substantially collimated left-eye light beams to the left eye of the viewer, such that the substantially collimated right-eye and left-eye light beams form three dimensional images.

One embodiment of the disclosure provides an electronically switchable light modulating cell, comprising: a compartment defined by a bottom substrate, two or more sidewalls, and a top substrate; a light shielding layer disposed on at least one of the top substrate and the bottom substrate, such that light propagating through the compartment is at most partially shielded by the light shielding layer; and a light modulating medium filled in the compartment.

One embodiment of the disclosure provides a method for displaying stereoscopic images associated with an image display system comprising a display device and a light modulating device disposed adjacent to the display device, wherein the display device alternately displays a right-eye image during a first period and a left-eye image during a second period, comprising: controlling the light modulating device to spatially or angularly deflect light beams associated with the right-eye image to the right eye of a viewer during the first period and to spatially or angularly deflect light beams associated with the left-eye image to the left eye of the viewer during the second period; and inserting a black frame during the transition from a right-eye image to a left-eye image.

One embodiment of the disclosure provides a method for displaying stereoscopic images associated with an image display system comprising a display device and a light modulating device disposed adjacent to the display device, wherein the display device has a first display area and a second display area, comprising: controlling the light modulating device to spatially or angularly deflect light beams associated with right-eye images to the right eye of a viewer and to spatially or angularly deflect light beams associated with left-eye images to the left eye of the viewer; during a first period, displaying by the display device a black frame in the first display area when the display device displays the right-eye or left-eye images in the second display area; and during a second period, displaying by the display device a black frame in the second display area when the display device displays the right-eye or left-eye images in the first display area.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
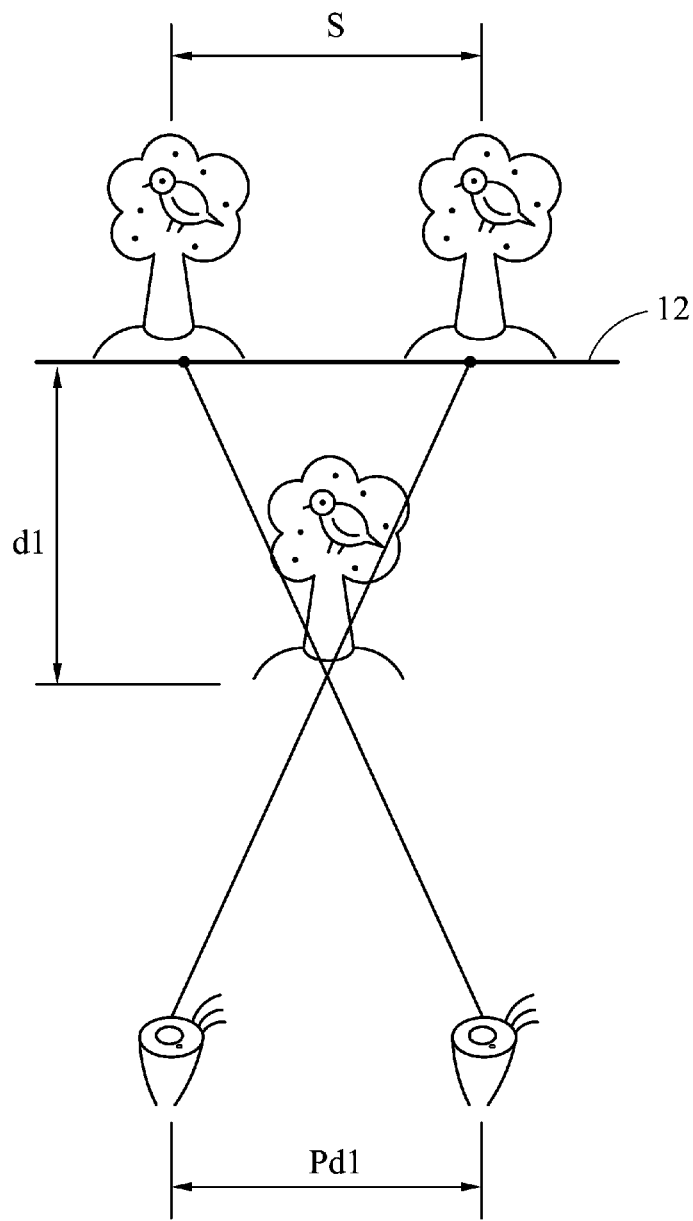
FIGS. 1A and 1B show a display issue from a conventional 3D image display.
Figure 1B:
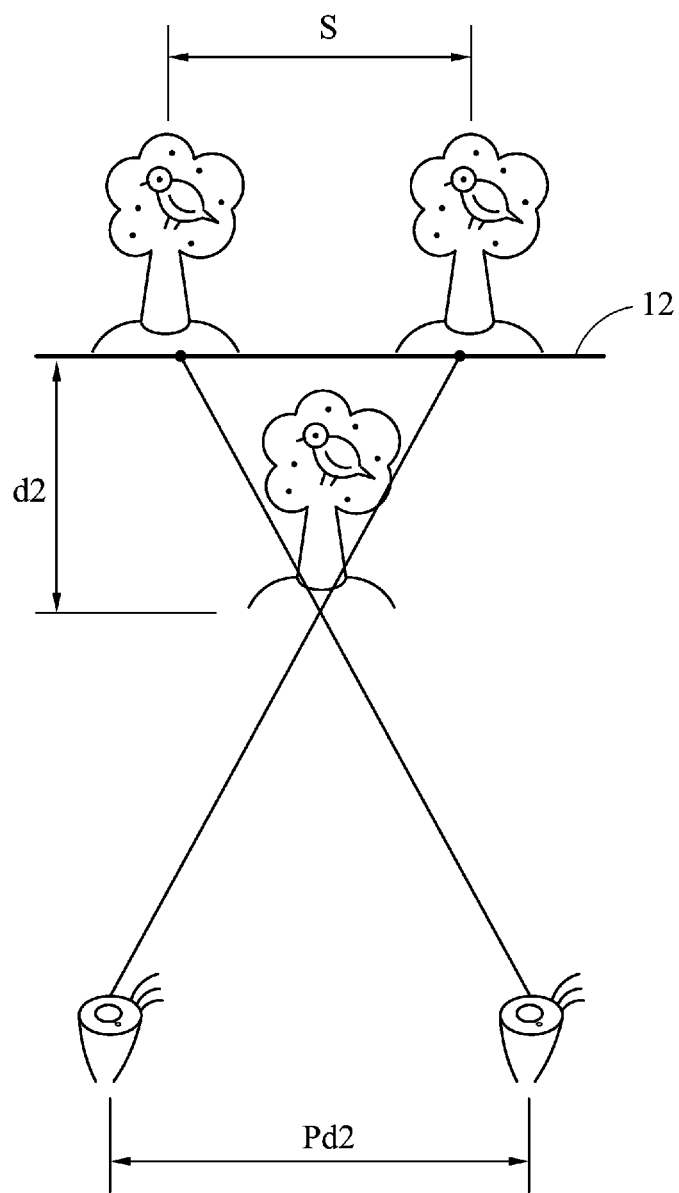
Figure 2:
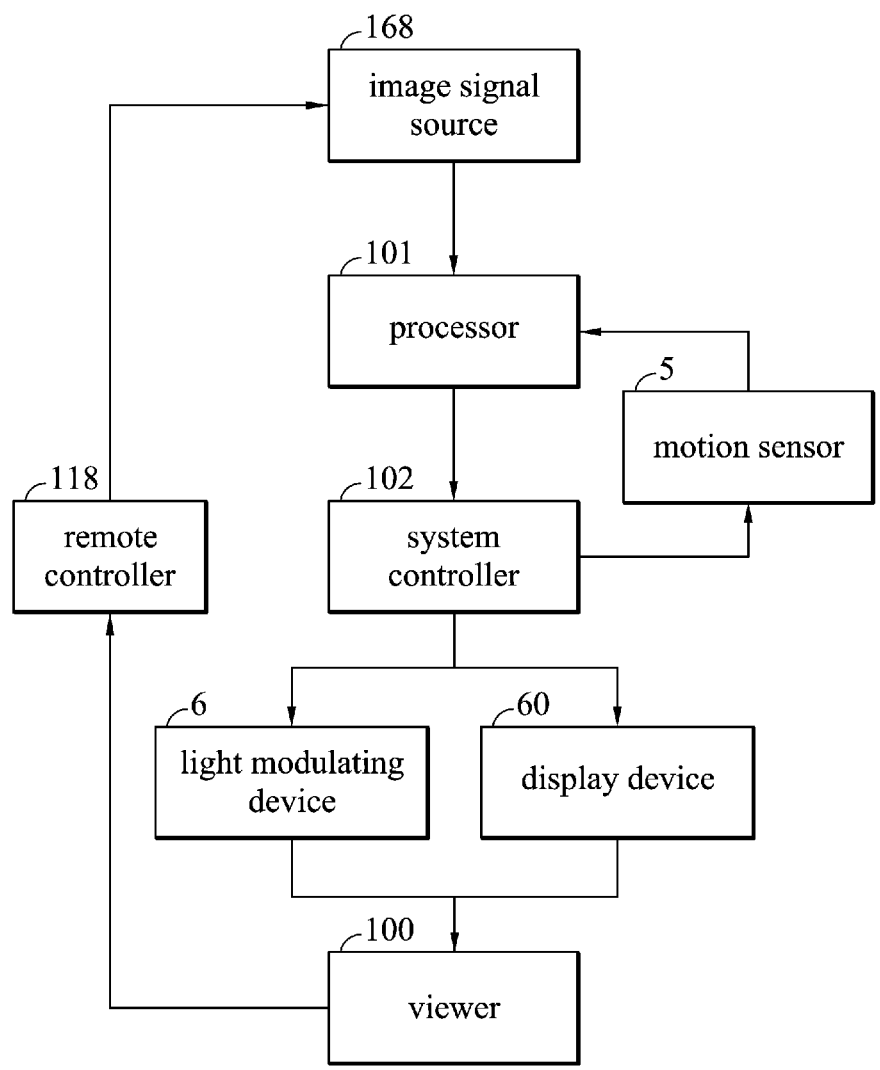
FIG. 2 shows an image display system for multi-viewing in one embodiment of the disclosure.

FIG. 2 shows an image display system for multi-viewing. The image display system includes a display device 60 for displaying right-eye images and left-eye images. A system controller 102 is electrically connected to the display device 60 and a light modulating device 6. A motion sensor 5, in response to a control signal from the system controller 102, determines the positions of the eyes of at least one viewer 100. A processor 101, in response to one or more image signals from the motion sensor 5, provides the system controller 102 with the positions of the eyes of the at least one viewer 100. The light modulating device 6 may spatially or angularly deflect the right-eye images to the right eye of the viewer 100 and spatially or angularly deflect the left-eye images to the left eye of the viewer 100 in accordance with the positions of the eyes of at least one viewer 100.

In one embodiment, the image display system for multi-viewing may further include an image signal source 168 for providing three-dimensional-image feeds to be displayed by the display device 60, as shown in FIG. 2. In addition, the image display system for multi-viewing may further include an image signal source 168 for providing two-dimensional-image feeds to be processed by the processor 101, wherein the two-dimensional-image feeds are displayed by the display device 60. Note that the display device 60 is configured to display two-dimensional images or three-dimensional images in accordance with a choice of a viewer.

Figure 3A:
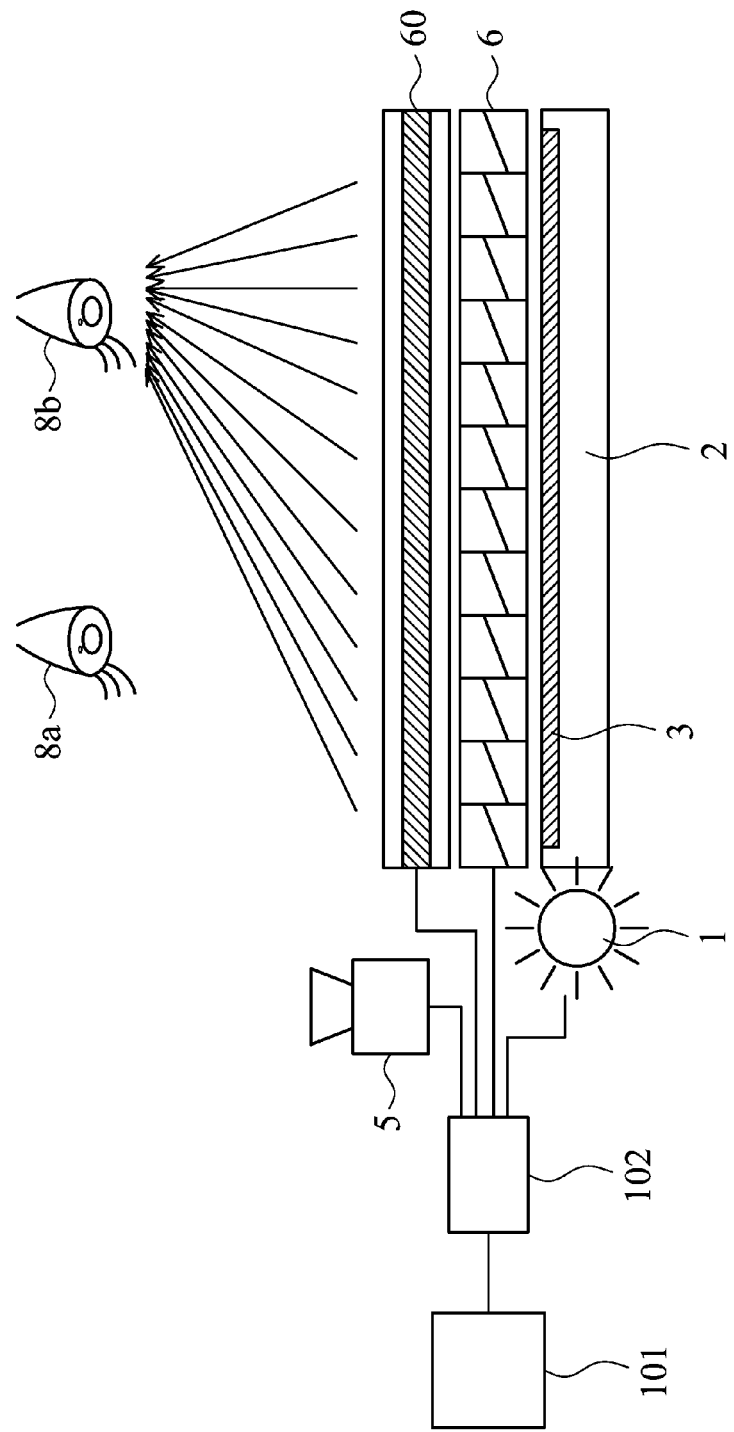
FIGS. 3A, 3B, 3C, 4A, 5A, 6A, 7, and 8 show image display systems in embodiments of the disclosure.
Figure 3B:
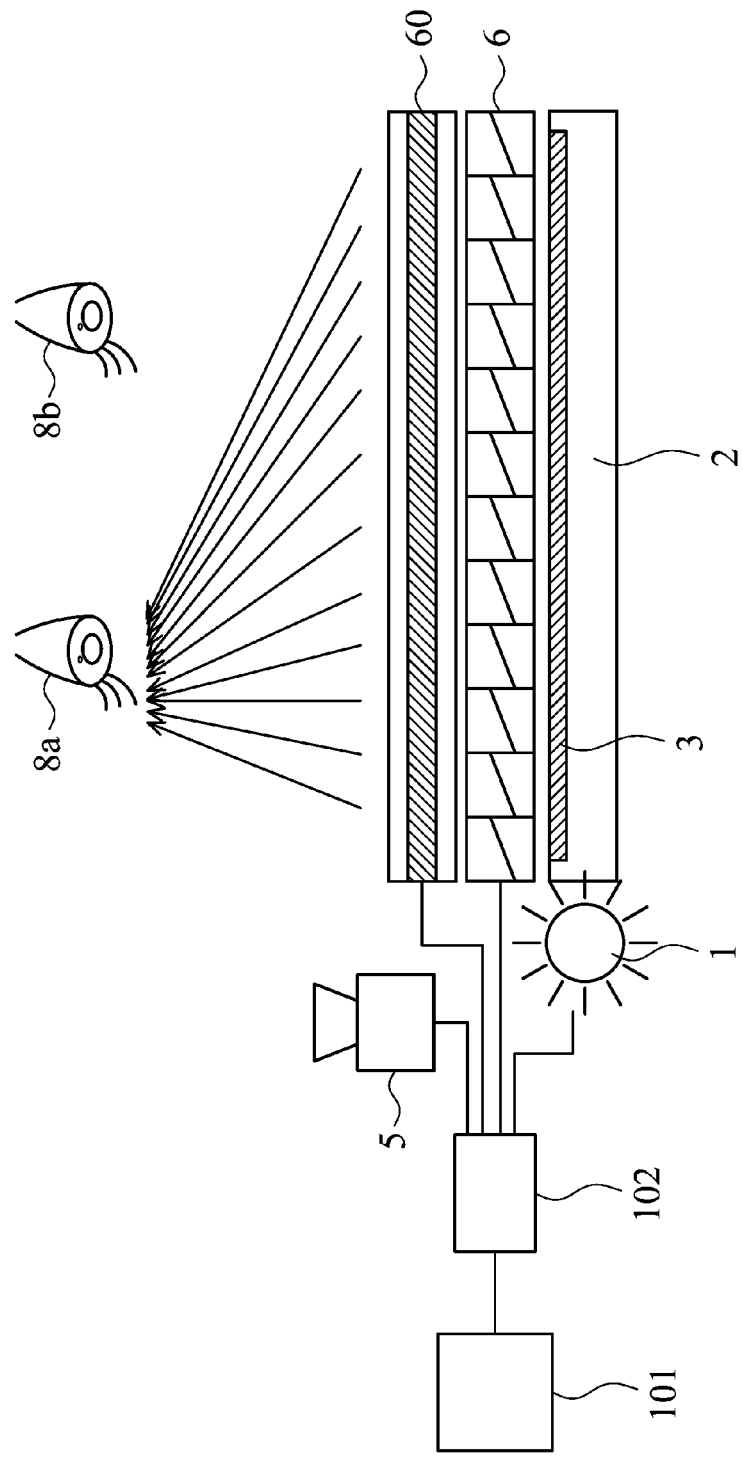
Figure 3C:
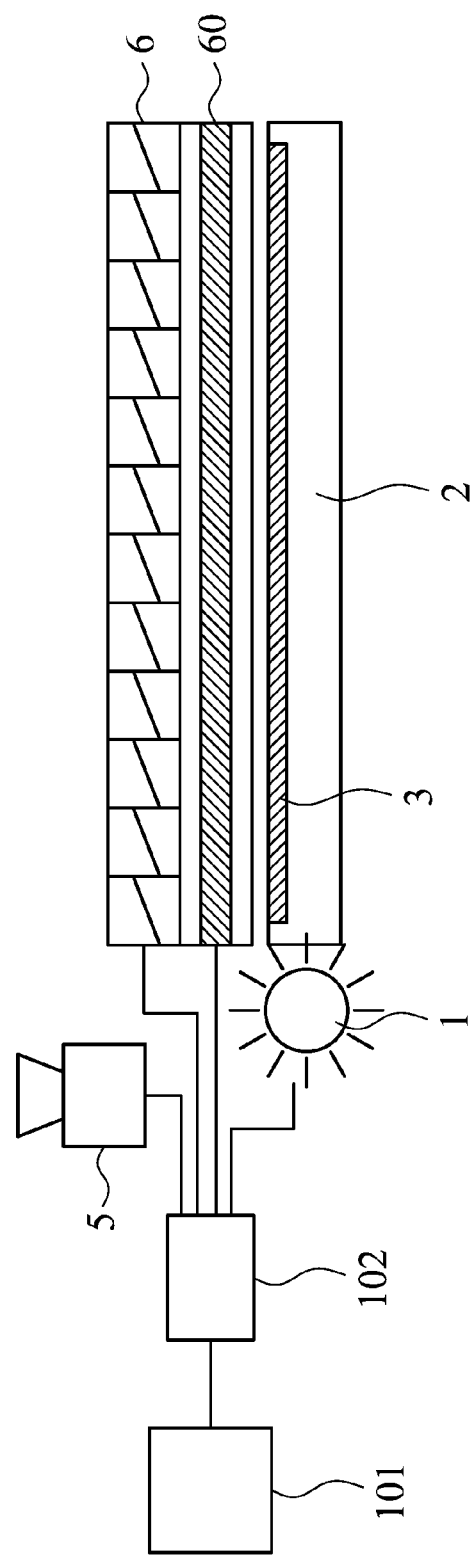
Figure 3D:
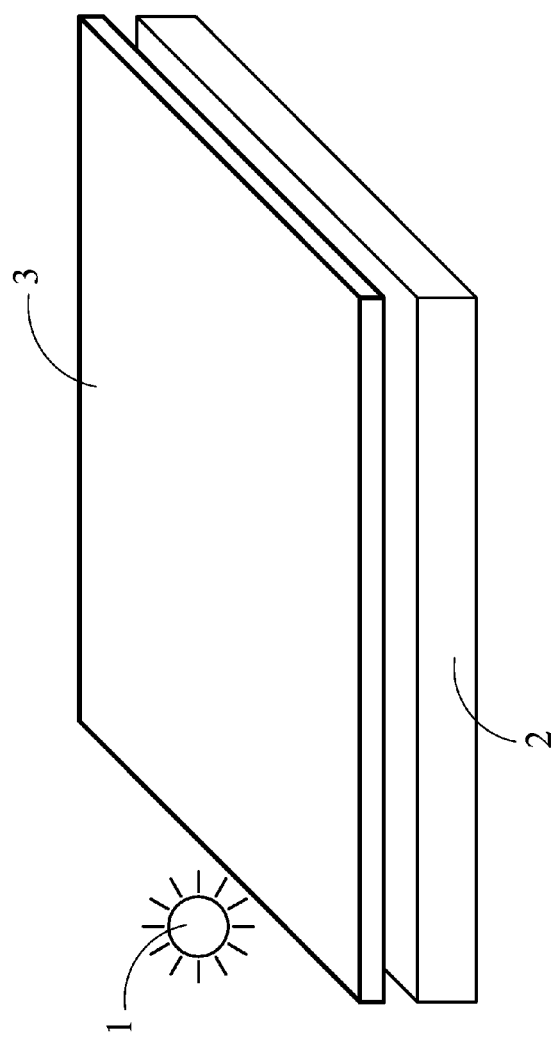
FIGS. 3D, 3E, 4C, 4D, 5C, 5D, 6E, and 6F show arrangements of side light source(s) and light guide element(s)
Figure 3E:
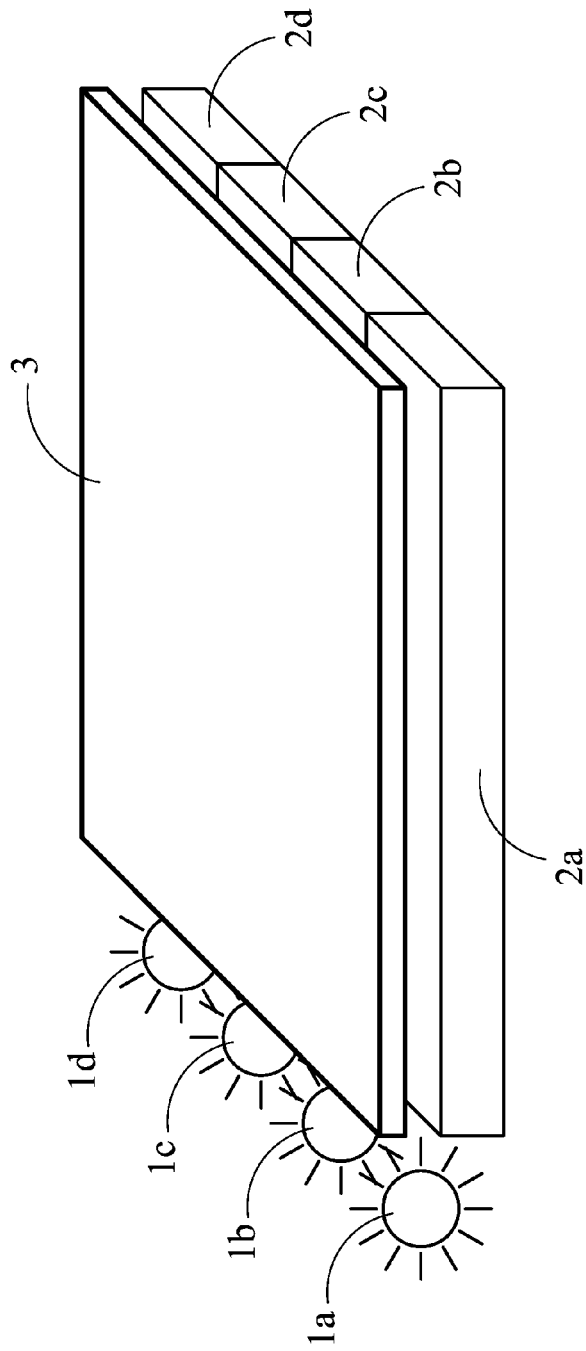

As shown in FIG. 2, the image display system may further include a remote controller 118, in communication with the system controller 102, for selecting at least one of two-dimensional-image feeds or three-dimensional-image feeds in accordance with a choice of a viewer, and for providing the system controller 102 with the positions associated with the eyes of a viewer. In one embodiment, the light modulating device 6 is disposed adjacent to the display device 60, as shown in FIGS. 3A-3C. In FIGS. 3A and 3B, an array type light modulating device 6 is disposed between a display device 60 and a light guide element 2. In FIG. 3C, the display device 60 is disposed between the array type light modulating device 6 and a light guide element 2. An optical film 3 is disposed on the light guide element 2, and a side light source 1 is located aside the light guide element 2. Obviously, the display device 60 is not a self-illumination device, e.g. LCD or projection display, and the light source 1 is present. The side light source 1 can be a single lamp collocated with a single light guide plate as shown in FIG. 3D. In another embodiment, a plurality of side light sources 1a, 1b, 1c, and 1d collocated with a plurality of light guide elements 2a, 2b, 2c, and 2d are arranged in an array, wherein each of the side light sources 1a, 1b, 1c, and 1d corresponds to each of the light guide elements 2a, 2b, 2c, and 2d, respectively, as shown in FIG. 3E. In an alternative embodiment, the side light source 1 and the light guide element 2 can be replaced by a backlight unit.

In FIGS. 3A-3C, the system controller 102 is electrically connected to the side light source 1, the motion sensor 5, the display device 60, the light modulating device 6, and the processor 101. In FIGS. 3A-3C, the right and eye positions 8a and 8B are monitored by the motion sensor 5, such that the processor 101 may obtain data such as a position of an observer, distance between the observer and the image display system, and distance of eyes. The light modulating device 6 is tuned by the system controller 102 on the basis of the described data, and the display panel 6 may display corresponding left eye images to the left eye 8b (FIG. 3A) and corresponding right eye images to the right eye 8a (FIG. 3B). Therefore, the right and left eye images will be combined in the brain of the observer for 3D effect.

The display device 60 includes a compensation film, LCD, OLED, polymer light emitting diode (PLED), plasma display panel (PDP), surface-conduction electron-emitter display (SED), CRT, field emission display (FED), or LED. The display device 60 can be classified as a self-illumination device or non-self-illumination device. The self-illumination device, such as an LED, is free of an additional light source. On the other hand, the non-self illumination device needs a light source, such as a backlight or a side light source with a light guide plate.

Figure 4A:
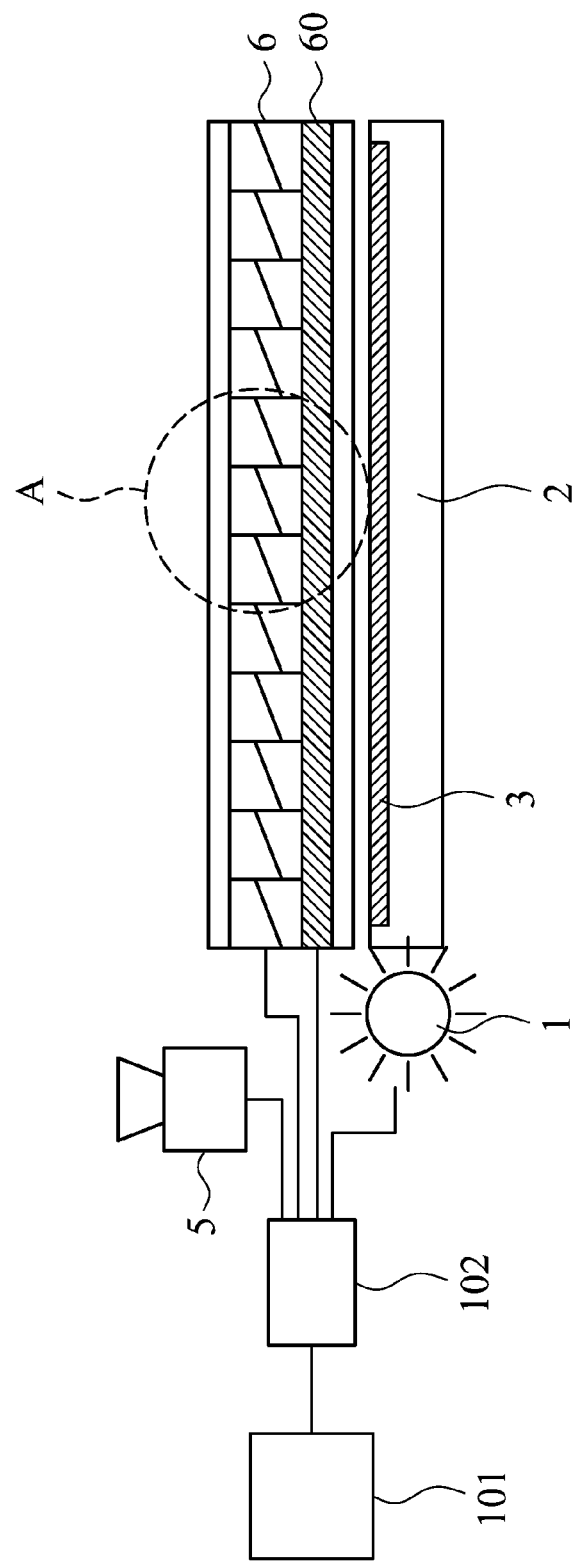
Figure 4B:
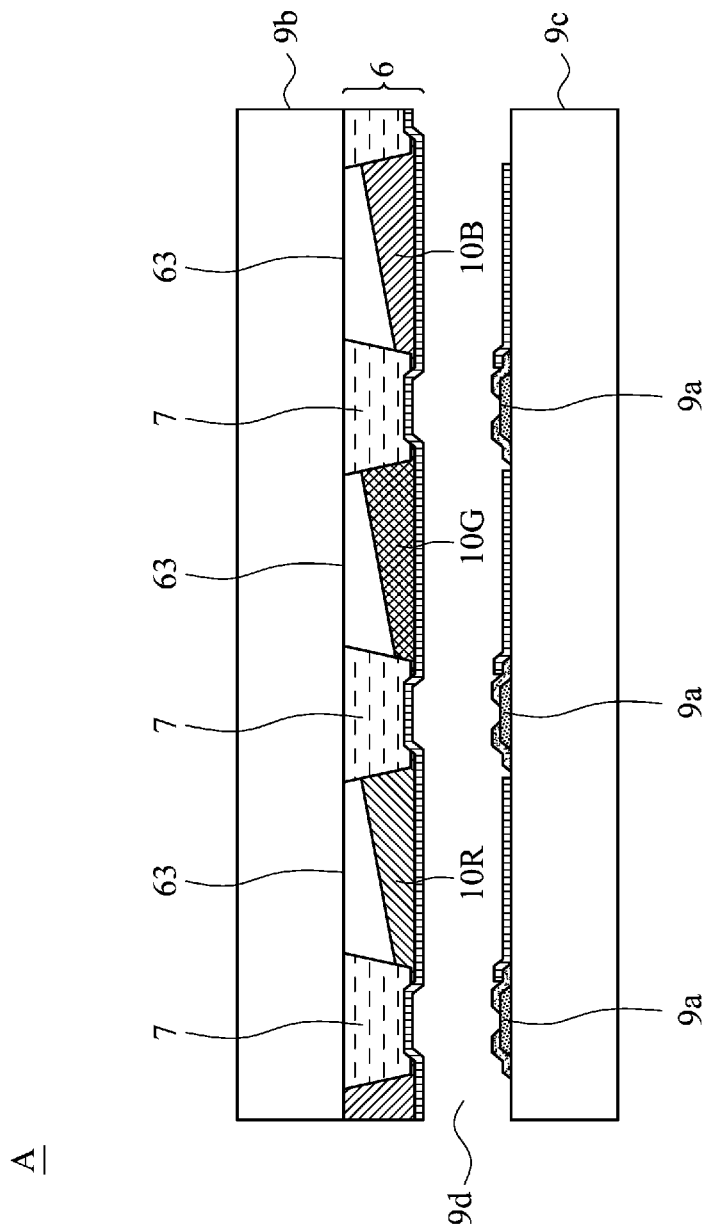
FIGS. 4B and 5B show partial enlarged diagrams of the dotted circle in FIGS. 4A and 5A, respectively.
Figure 4C:
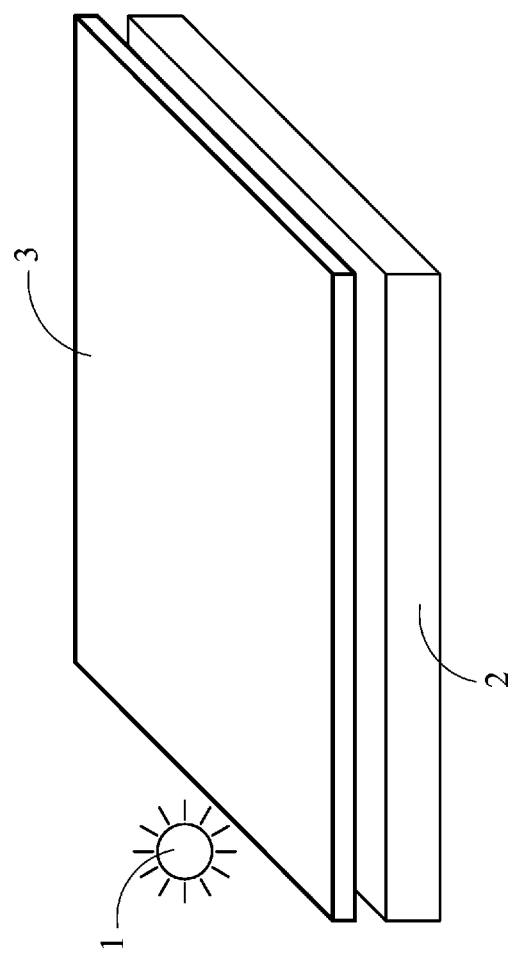
Figure 4D:
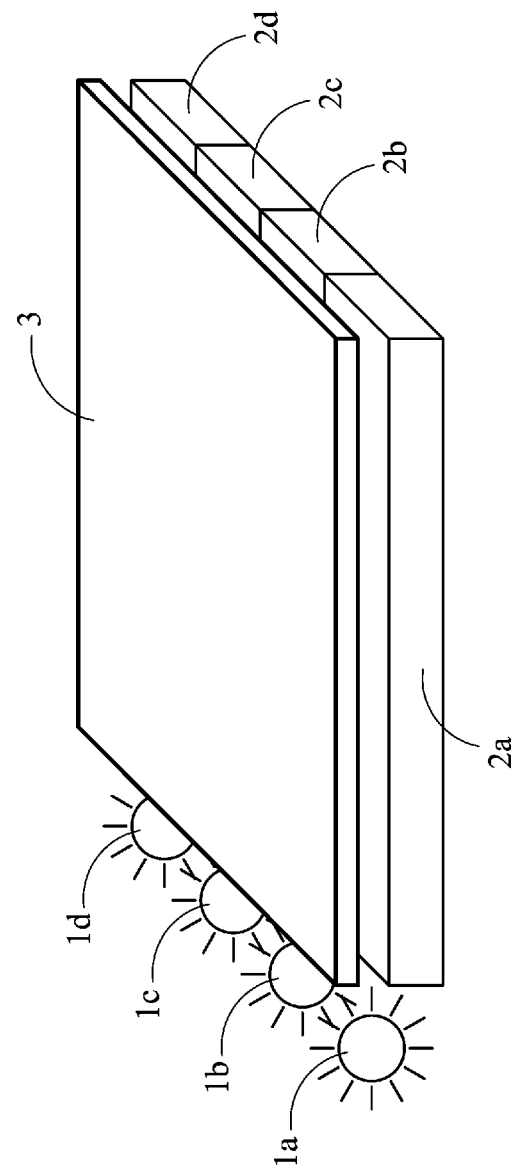

FIG. 4A shows an image display system, and FIG. 4B shows a partial enlarged diagram of the dotted circle in FIG. 4A. Similar to FIG. 3C, the image display system in FIG. 4A has an optical film 3 disposed on the light guide element 2, and a side light source 1 located aside the light guide element 2. The side light source 1 can be a single lamp collocated with a single light guide plate as shown in FIG. 4C. In another embodiment, a plurality of side light sources 1a, 1b, 1c, and 1d are collocated with a plurality of light guide elements 2a, 2b, 2c, and 2d arranged in an array, wherein each of the side light sources 1a, 1b, 1c, and 1d corresponds to each of the light guide elements 2a, 2b, 2c, and 2d, respectively, as shown in FIG. 4D. In an alternative embodiment, the side light source 1 and the light guide element 2 can be replaced by a backlight unit.

In FIG. 4A, the system controller 102 is electrically connected to the side light source 1, the motion sensor 5, the display device 60, the light modulating device 6, and the processor 101. In FIG. 4B, the light modulating device 6 includes a plurality of electronically switchable light modulating cells 63 separated by the spacers 7. The difference between the FIGS. 3C and 4A is that the light modulating device 6 in FIG. 4A is formed between the top substrate 9b and the bottom substrate 9c of the display device 60 to complete an image display cell, rather than formed on the outside of the top substrate in FIG. 3C. This design is the so-called in-plane structure. The image display cell in FIG. 4B includes the top substrate 9b and the bottom substrate 9c. A light modulating device, such as a liquid crystal cell 9d, can be disposed between the top substrate 9b and the bottom substrate 9c. The liquid crystal cell 9d is controlled by TFTs 9a on the bottom substrate 9c, to permit light to travel therethrough or be shielded by the liquid crystal cell 9d. Another light modulating device 6 is used to spatially or angularly direct light to be emitted from the side light source 1. Furthermore, the light modulating medium in the light modulating device 6 can be dyed to be red, green, blue, yellow, cyan, magenta, or the likes by a pigment, a colorant, or a dye to serve as deformable color filters 10R, 10G, and 10B. In addition, a plurality of the image display cells in FIG. 4B may construct an image display device.

Figure 5A:
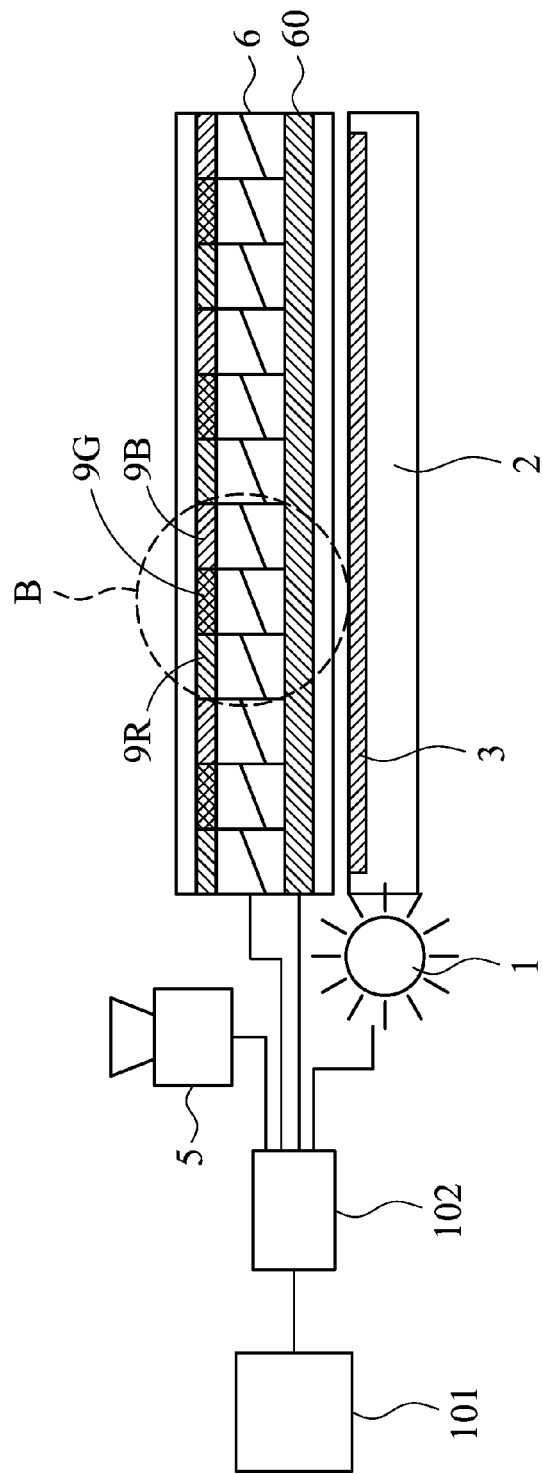
Figure 5B:
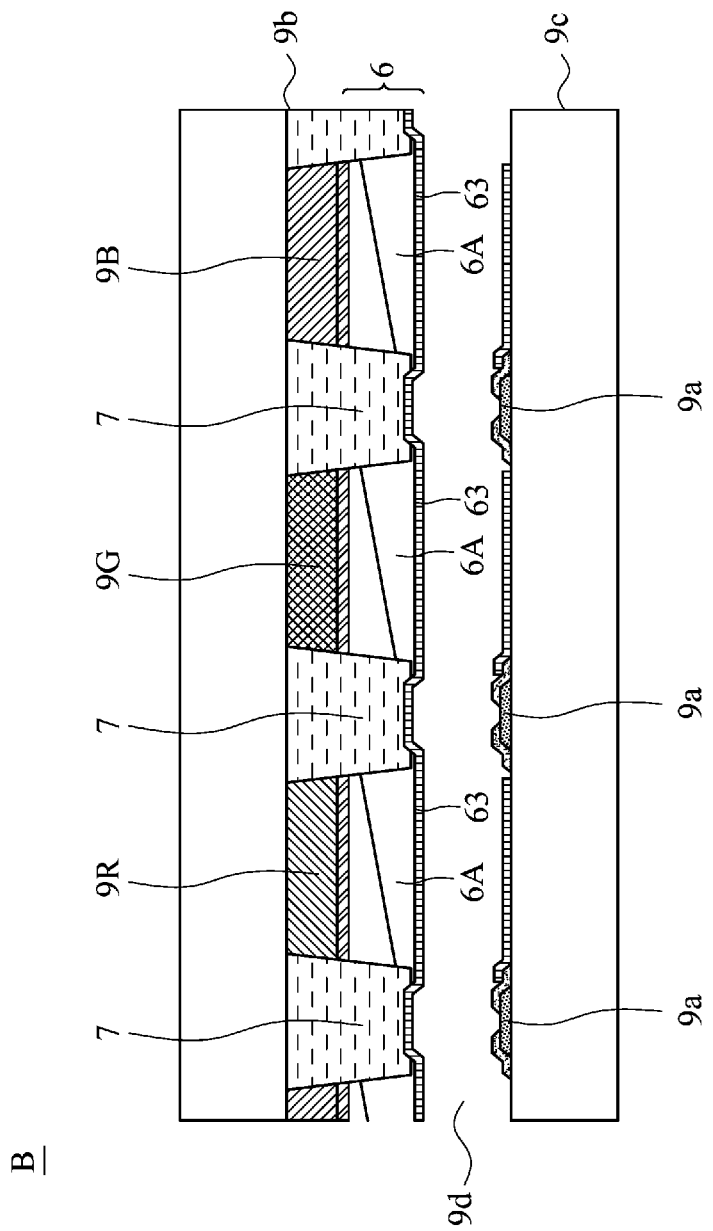
Figure 5C:
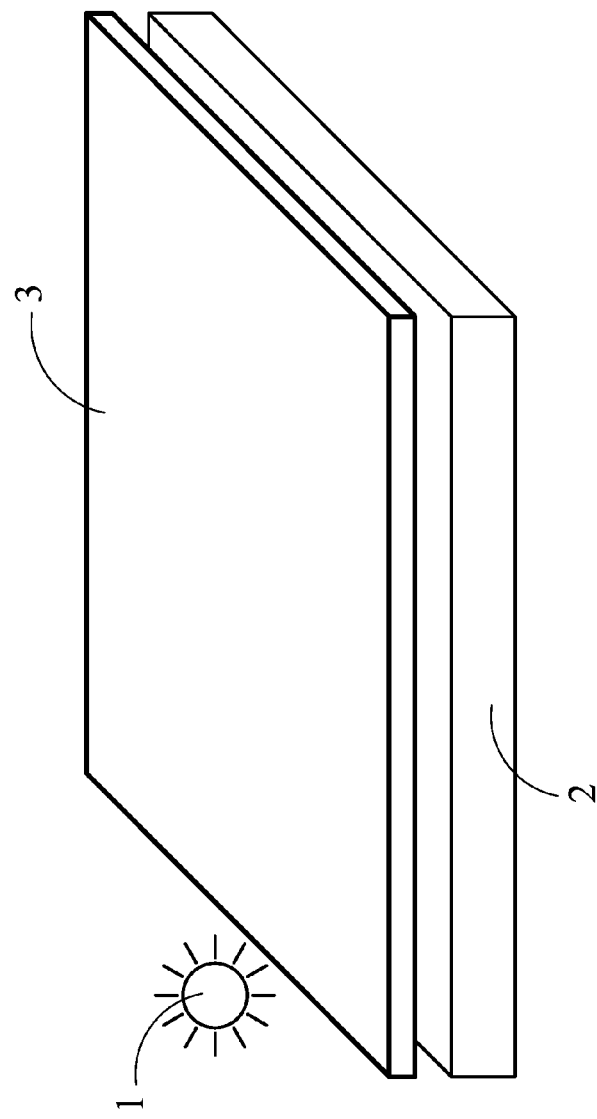
Figure 5D:
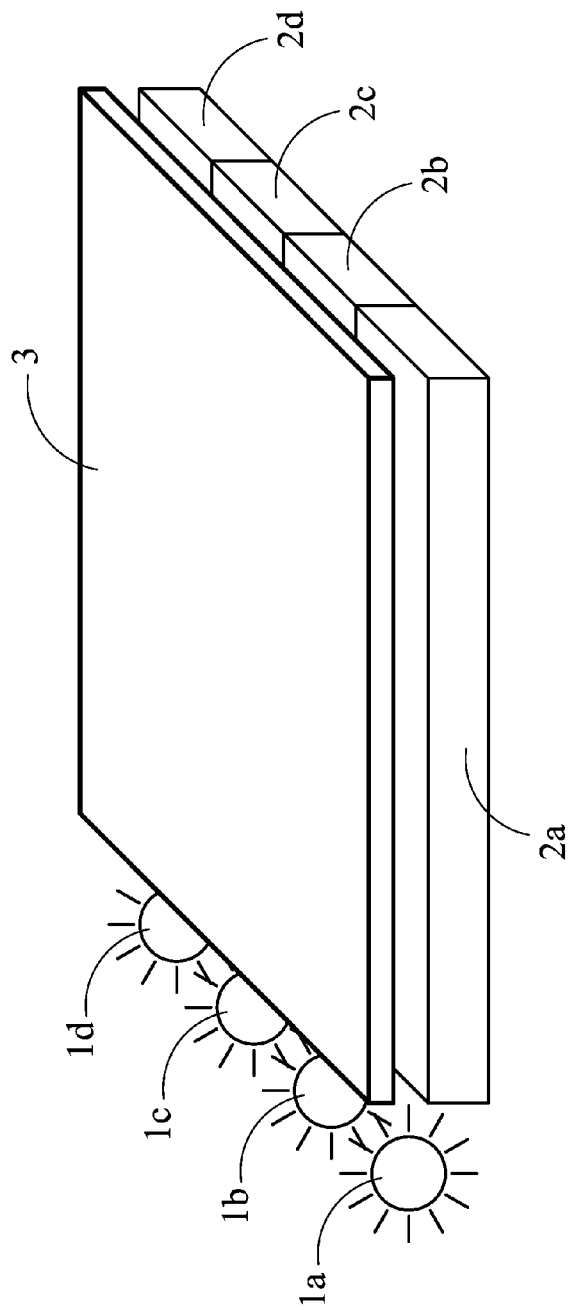

FIG. 5A shows an image display system, and FIG. 5B shows a partial enlarged diagram of the dotted circle in FIG. 5A. Similar to FIG. 4A, the image display system in FIG. 5A has an optical film 3 disposed on the light guide element 2, and a side light source 1 located aside the light guide element 2. The side light source 1 can be a single lamp collocated with a single light guide plate as shown in FIG. 5C. In another embodiment, a plurality of side light sources 1a, 1b, 1c, and 1d collocated with a plurality of light guide elements 2a, 2b, 2c, and 2d are arranged in an array, wherein each of the side light sources 1a, 1b, 1c, and 1d corresponds to each of the light guide elements 2a, 2b, 2c, and 2d, respectively, as shown in FIG. 5D. In an alternative embodiment, the side light source 1 and the light guide element 2 can be replaced by a backlight unit.

In FIG. 5A, the system controller 102 is electrically connected to the side light source 1, the motion sensor 5, the display device 60, the light modulating device 6, and the processor 101. The difference between the FIGS. 5A and 4A is that the light modulating medium 6A in the light modulating device 6 is not dyed in FIG. 5A. As shown in FIG. 5A, the color filters 9R (red), 9G (green), 9B (blue), or the color filters of other colors (yellow, cyan, magenta, or the likes) are formed on the top substrate 9b of the display device 60. In general, the top substrate 9b is the so-called CF substrate, and the bottom substrate 9c is the so-called array substrate.

In another embodiment, the color filters 9R (red), 9G (green), 9B (blue), or the color filters of other colors (yellow, cyan, magenta, or the likes) are formed on the bottom substrate 9c other than the top substrate 9b. When the TFTs 9a are disposed between the color filters 9R, 9G, and 9B, the bottom substrate 9c is the so-called color filter on array (COA) substrate. When the color filters 9R, 9G, and 9B are disposed between the TFTs 9a and the bottom substrate 9c, the bottom substrate 9c is the so-called array on color filter (AOC) substrate.

In FIG. 5B, the light modulating device 6 includes a plurality of electronically switchable light modulating cells 63 separated by the spacers 7. Each of the electronically switchable light modulating cells 63 contains the light modulating medium 6A to spatially or angularly direct the light to be emitted from the side light source 1. Whatever color filters 9R, 9G, and 9B are formed on the top substrate 9b or the bottom substrate 9c, each of the electronically switchable light modulating cells 63 corresponds to one or more color filters 9R, 9G, and 9B.

In another embodiment, the light modulating medium 6A is further dyed by a pigment, a colorant, or a pigment to be red, green, blue, yellow, cyan, magenta, or the likes. Note that the color of the light modulating medium 6A should be similar to that of the corresponding color filter.

Figure 6A:
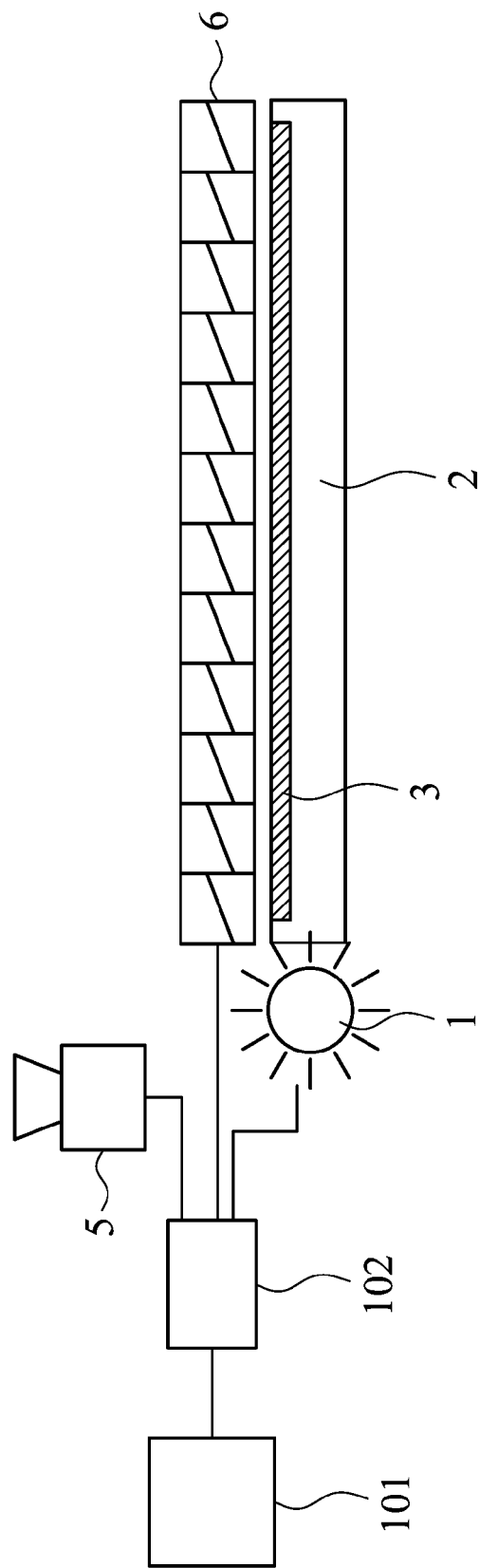
Figure 6D:
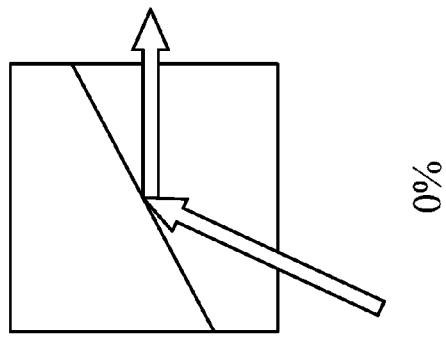
FIGS. 6B, 6C, and 6D show the light path incident into the light modulating device in one embodiment of the disclosure.
Figure 6C:
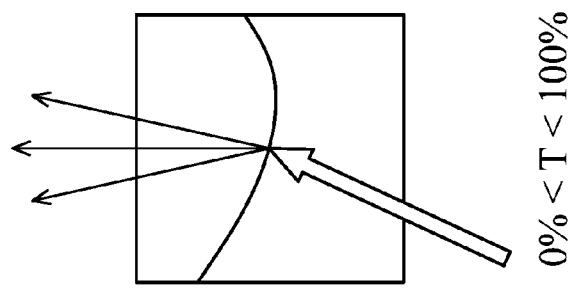
Figure 6B:
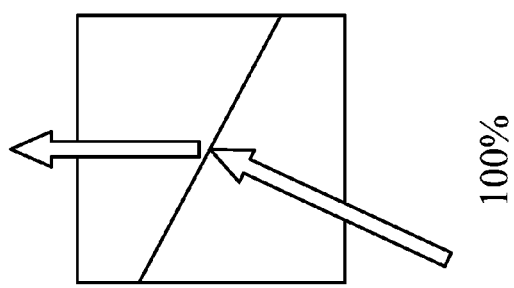
Figure 6E:
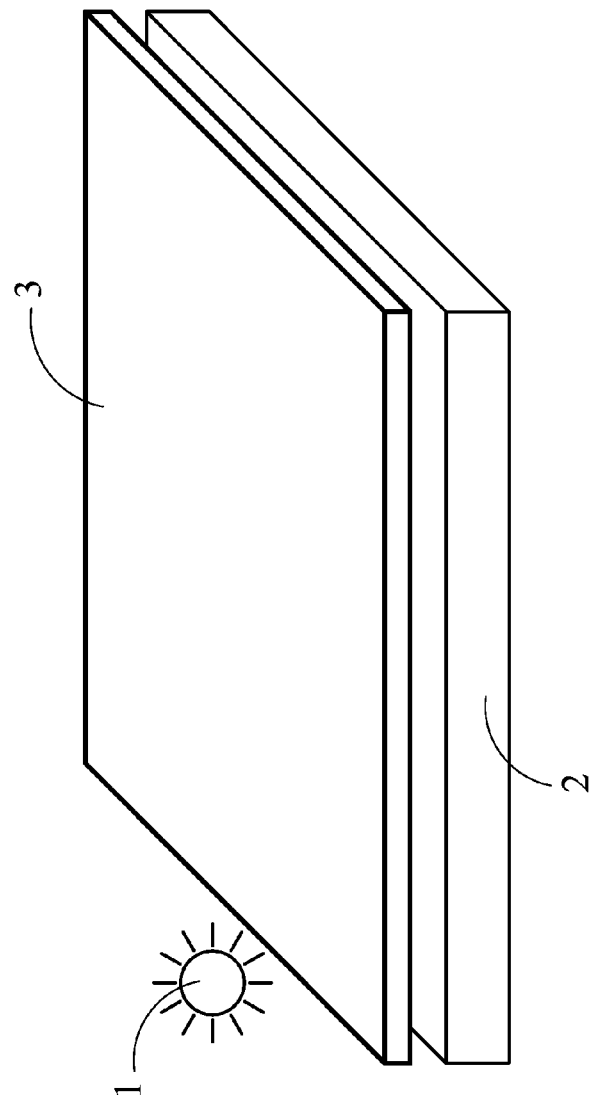
Figure 6F:
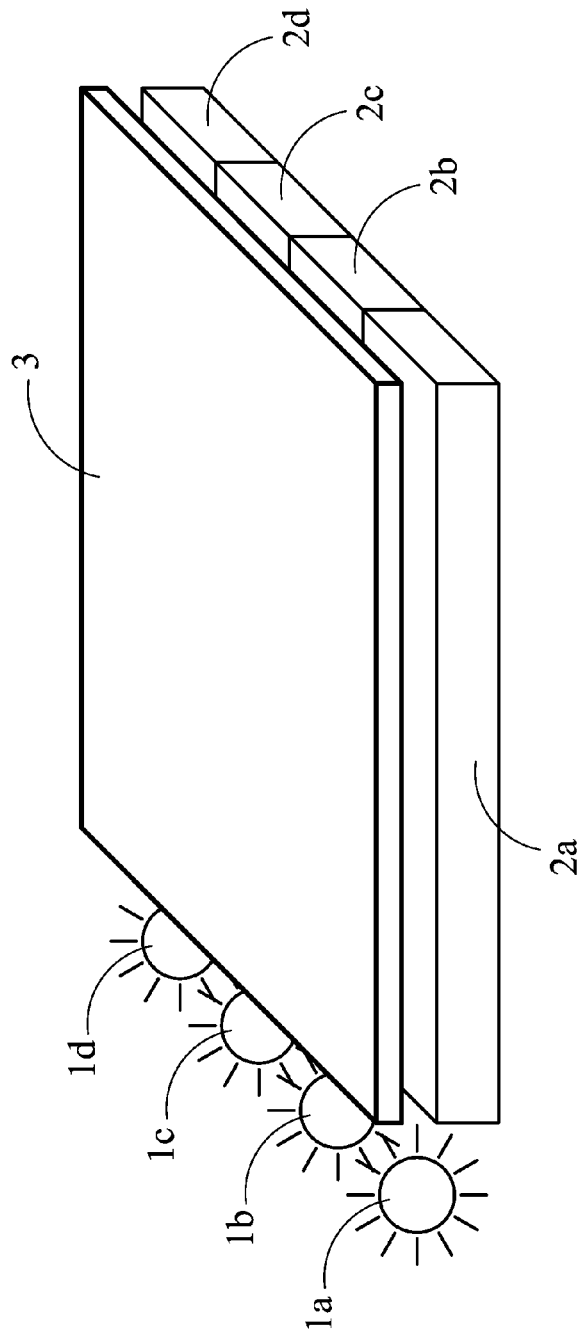

FIG. 6A shows an image display system. Similar to FIG. 4A, the image display system in FIG. 6A has an optical film 3 disposed on the light guide element 2, and a side light source 1 located aside the light guide element 2. The side light source 1 can be a single lamp collocated with a single light guide plate as shown in FIG. 6E. In another embodiment, a plurality of side light sources 1a, 1b, 1c, and 1d collocated with a plurality of light guide elements 2a, 2b, 2c, and 2d are arranged in an array, wherein each of the side light sources 1a, 1b, 1c, and 1d corresponds to each of the light guide elements 2a, 2b, 2c, and 2d, respectively, as shown in FIG. 6F. In an alternative embodiment, the side light source 1 and the light guide element 2 can be replaced by a backlight unit.

In FIG. 6A, the system controller 102 is electrically connected to the side light source 1, the motion sensor 5, the light modulating device 6, and the processor 101. Note that the display device 60 can be omitted in this embodiment. Similar to FIG. 4B, the light modulating medium in the light modulating device 6 is dyed to be red, green, blue, yellow, cyan, magenta, or the likes by colorant, pigment, or dye. Furthermore, the light from the side light source 1 travelling through the light guide element 2 tilts incident light to the light modulating medium, as shown in FIGS. 6B-6D. In FIG. 6B, the tilted light may travel through the light modulating medium with a transmission of 100% (ON state) and a color of red, green, blue, or the likes. In FIG. 6C, the tilted light may travel through the light modulating medium with a transmission of greater than 0% and less than 100% (grey level) and a color of red, green, blue, or the likes. In FIG. 6D, the tilted light will be reflected by the light modulating with a transmission of 0% (OFF state). The light modulating device 6 may direct or even shield the light from the side light source 1. In other words, the light modulating device 6 in FIG. 6A may function as the liquid crystal cell 9d and the light modulating device 6 in FIG. 4B.

Figure 7:
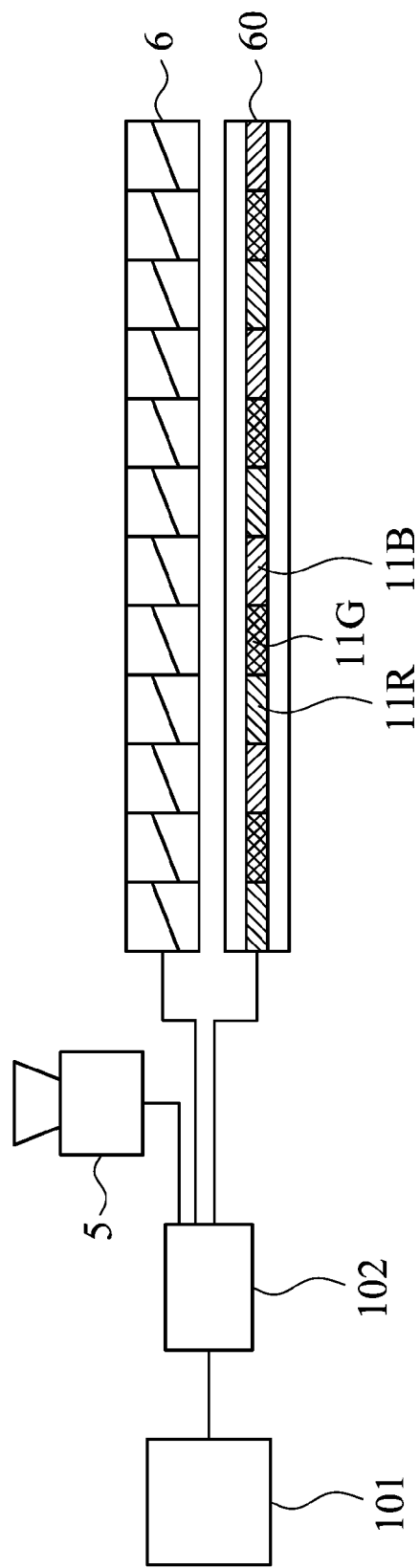

FIG. 7 shows an image display system. In FIG. 7, the system controller 102 is electrically connected to the motion sensor 5, the display device 60, the light modulating device 6, and the processor 101. Because the display device 60 is a self-illumination device, this image display system is free of the light source, the light guide plate, and the compensation film as the previously mentioned embodiment. The self-illumination device can be a PDP, an OLED, an LED, or a SED, and preferably an OLED. Each of the pixels 11R, 11G, and 11B of the display device 60 may emit red, green, and blue lights, respectively. In addition, the pixels may further emit other colors such as yellow, cyan, or magenta. As such, the light modulating medium in the light modulating device 6 is not dyed, and no additional color filter is needed.

Figure 8:
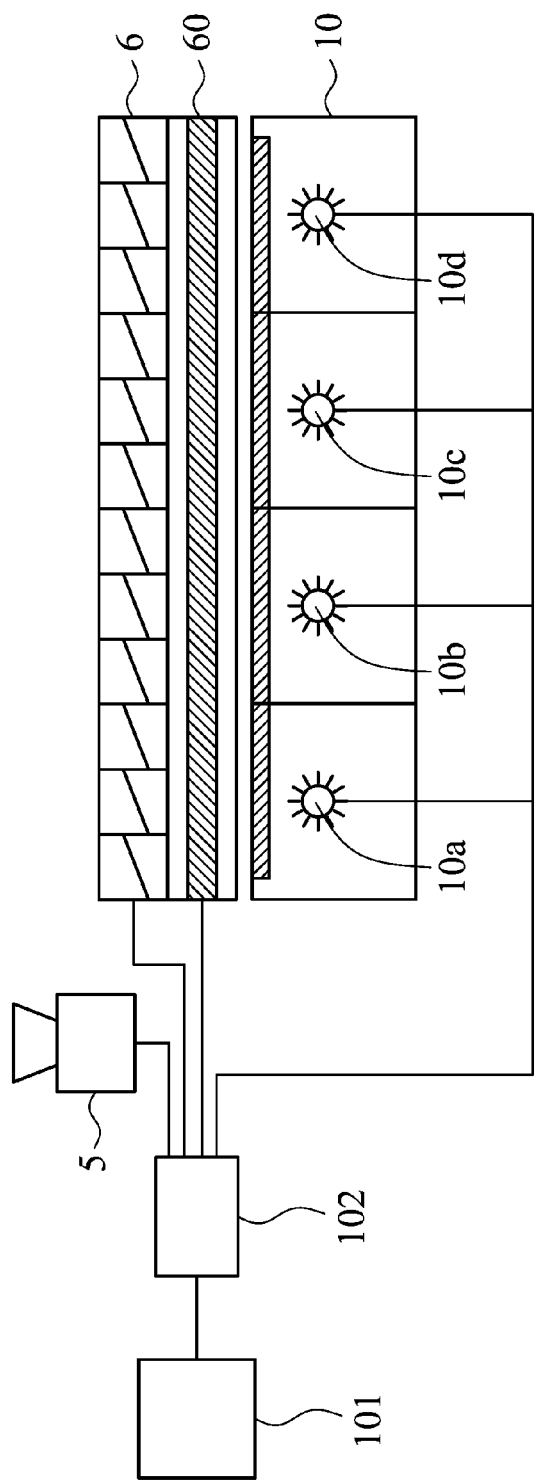

FIG. 8 shows an image display system. In FIG. 8, the image display system has an optical film 3 disposed on a backlight unit 10, such as a plurality of lamps 10a, 10b, 10c, and 10d arranged in an array or a matrix. In another embodiment, the backlight unit 10 is a single lamp. Similar to FIG. 3C, the system controller 102 is electrically connected to backlight unit 10, the motion sensor 5, the display device 60, the light modulating device 6, and the processor 101.

The described image display device may provide right-eye images and left-eye images. The optical film 3 such as a compensative film may modulate light beams associated with the right-eye images and light beams associated with the left-eye images to form substantially collimated light beams. The light modulating device 6 disposed adjacent to the display device 60 may spatially or angularly direct the substantially collimated right-eye light beams to the right eye of a viewer, and spatially or angularly direct the substantially collimated left-eye light beams to the left eye of the viewer. As such, the substantially collimated right-eye and left-eye light beams form three dimensional images.

Figure 9B:
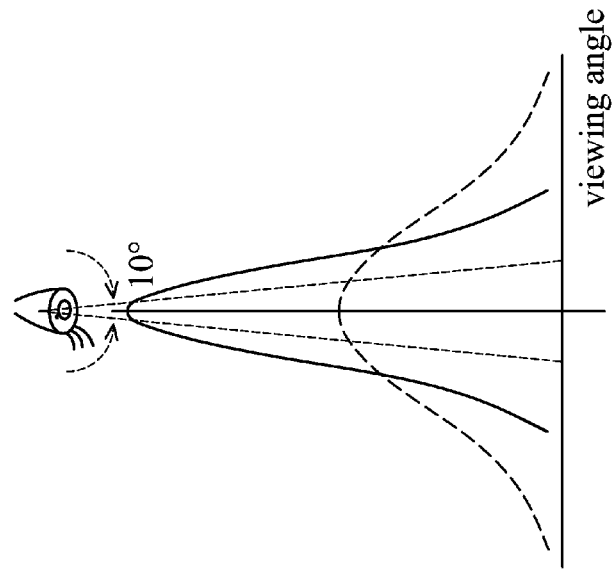
FIGS. 9B and 9D show viewing angles of the image display devices in embodiments of the disclosure.
Figure 9A:
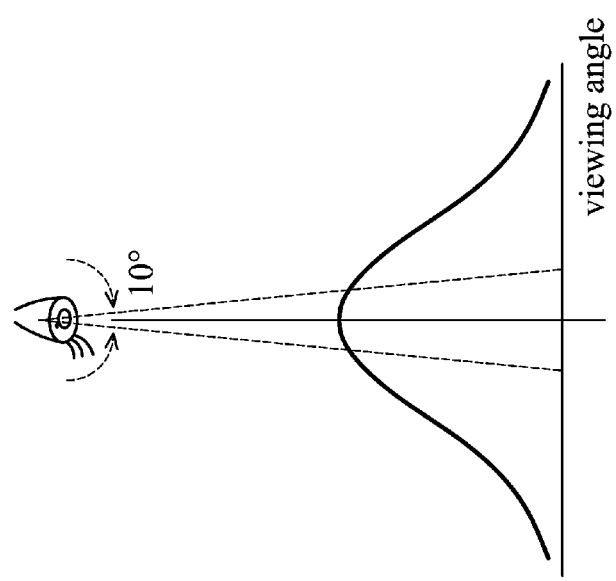
FIGS. 9A and 9C show viewing angles of conventional image display devices.
Figure 9D:
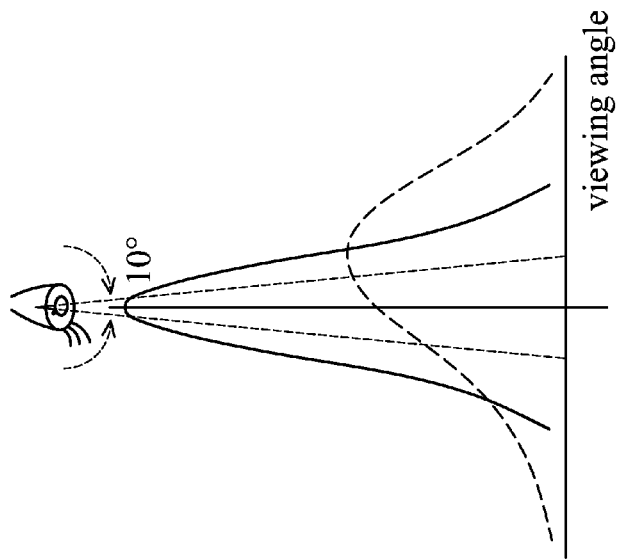
Figure 9C:
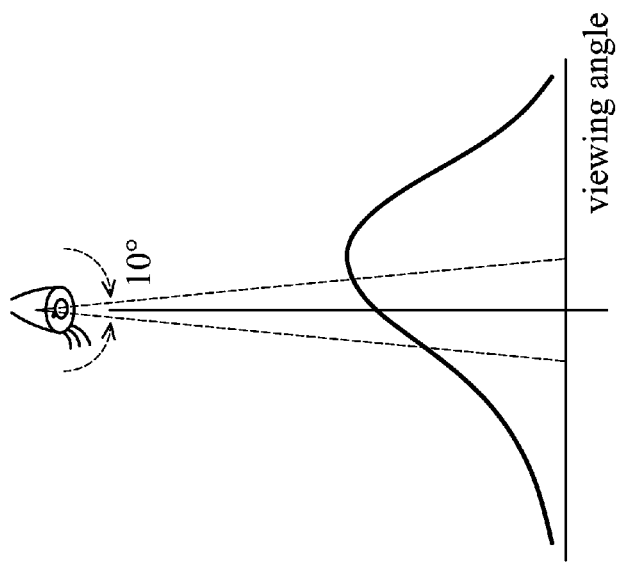
Figure 10:
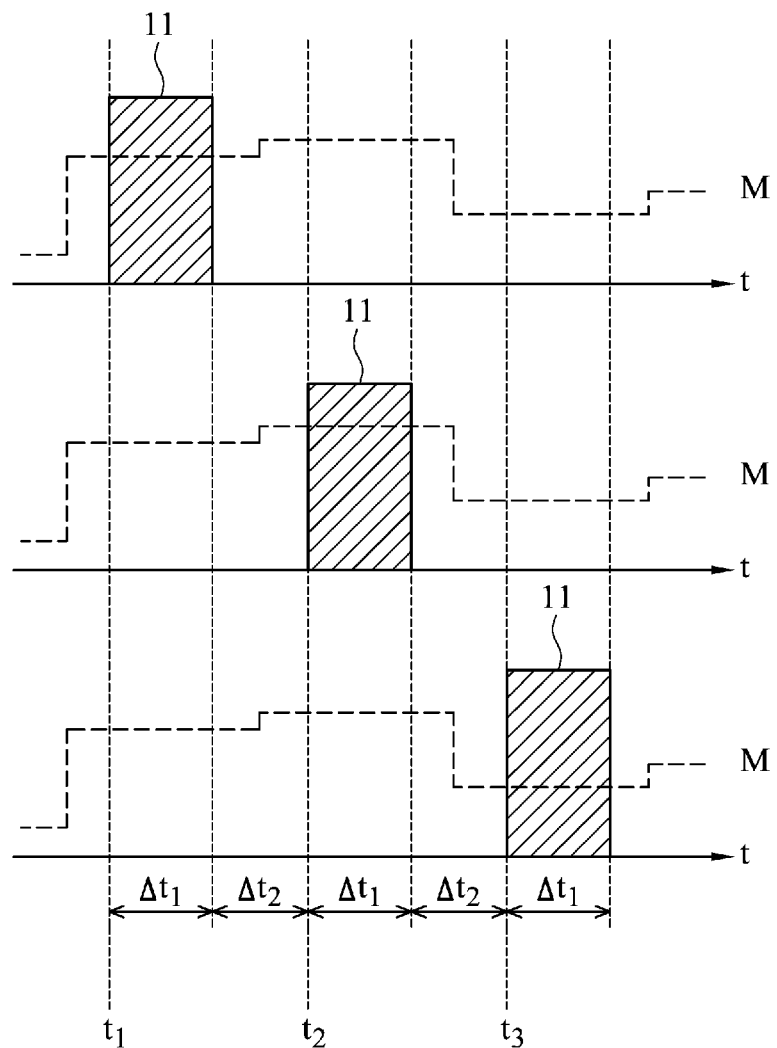
FIG. 10 shows a display mode of inserting black frames in one embodiment of the disclosure.

FIG. 9A shows a viewing angle of a conventional image display device utilizing a backlight unit or a self-illumination device, and FIG. 9B shows a viewing angle of the image display device in FIGS. 7 and 8 utilizing the light modulating device 6. FIG. 9C shows a viewing angle of a conventional image display device utilizing a side light source, and FIG. 9D shows a viewing angle of the image display device in FIGS. 3A-3C, 4A, 5A, and 6A utilizing the light modulating device 6. Because the light modulating device 6 may direct the light beam, the three dimensional images are perceivable by the viewer at a viewing angle of less than 90°. In other words, the display device 60 in the disclosure does not need a wide viewing angle as the conventional display panel.

The disclosure also provides a method for displaying stereoscopic images associated with an image display system. In one embodiment, the image display system includes a display device 60 and a light modulating device 6 disposed adjacent to the display device 60, as shown in FIGS. 3A-3C, 4A, 5A, 6A, 7, 8, and 9A. According to the step signal M, the light modulating device 6 to spatially or angularly deflect light beams associated with the right-eye image to the right eye of a viewer during the first period $t_1$ to $t_2$ (and after $t_3$), and spatially or angularly deflect light beams associated with the left-eye image to the left eye of the viewer during the second period $t_2$ to $t_3$. The display device 60 displays right-eye images according to pulse signals 11 during the periods $\Delta t_1$ in $t_1$ to $t_2$ and after $t_3$, and displays left-eye images according to a pulse signal 11 during the period $\Delta t_1$ in $t_2$ to $t_3$. As such, the display device 60 displays black frames during the transition periods $\Delta t_2$, in which the deflection direction of the light modulating device 6 is transited from right to left (or from left to right) according to the transition point of the step signal M.

When the display device 60 is a self-illumination device as shown in FIG. 7, the step of displaying the black frames can be switching off the self-illumination device during the transition periods $\Delta t_2$. When the display device 60 is collocated with a backlight unit 10 as shown in FIG. 8, the step of displaying the black frame can be switching off the backlight unit 10. When the display device 60 is collocated with a side light source 1 as shown in FIGS. 3A-3C, 4A, 5A, and 6A, the step of displaying the black frame can be switching off the side light source 1. As shown in FIGS. 6A and 6D, the light modulating device 6 can be directly tuned to effectively block out the light beams associated with the right-eye and left-eye images, respectively. In this condition, the side light source 1 is maintained as being bright when the light modulating device 6 is tuned.

Figure 11A:
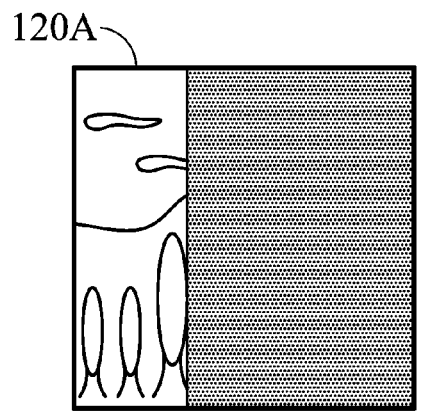
FIGS. 11A-11L show display areas of the display device in one embodiment of the disclosure.
Figure 11B:
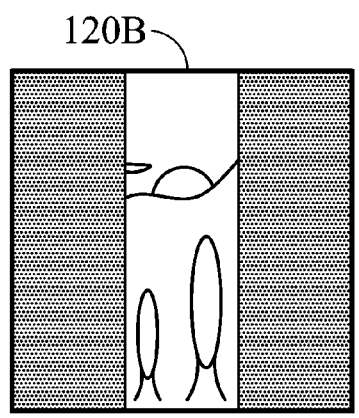
Figure 11C:
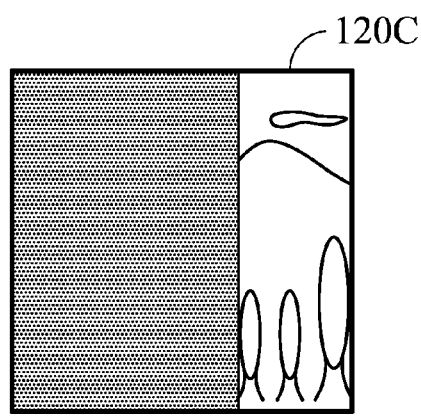
Figure 11D:
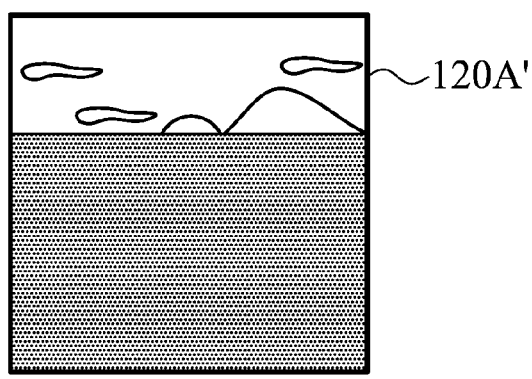
Figure 11E:
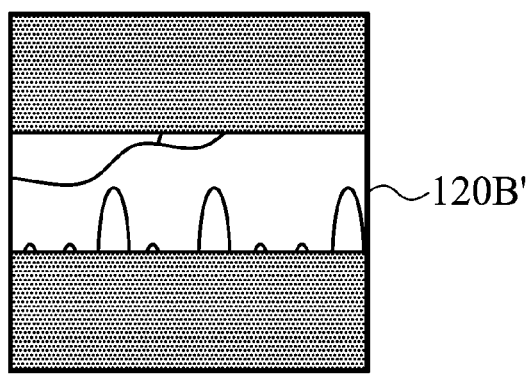
Figure 11F:
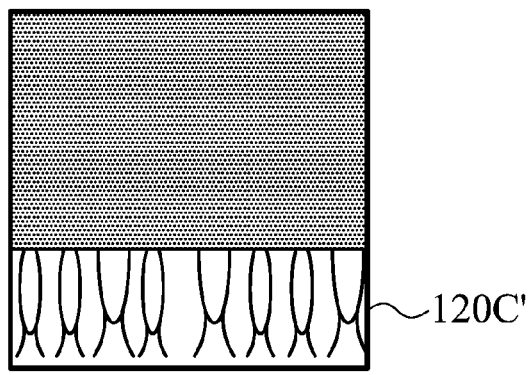

The described black frame will make the screen of the display device 60 be totally black. However, the display device 60 can be divided into a plurality of display areas 120A, 120B, and 120C in FIGS. 11A-11C, and 120A', 120B' and 120C' in FIGS. 11D-11F. The light modulating device 6 is controlled to spatially or angularly deflect light beams associated with right-eye images to the right eye of a viewer and to spatially or angularly deflect light beams associated with left-eye images to the left eye of the viewer. For example, during a first period, the display device 60 displays a black frame in the display areas 120B and 120C when the display device 60 displays the right-eye images in the display area 120A. During a second period, the display device 60 displays a black frame in the display areas 120A and 120C when the display device 60 displays the right-eye in the display area 120B. During a third period, the display device 60 displays a black frame in the display areas 120A and 120B when the display device 60 displays the right-eye images in the display area 120C. During a fourth period, the display device 60 displays a black frame in the display areas 120B and 120C when the display device 60 displays the left-eye images in the display area 120A. During a fifth period, the display device 60 displays a black frame in the display areas 120A and 120C when the display device 60 displays the left-eye images in the display area 120B. During a sixth period, the display device 60 displays a black frame in the display areas 120A and 120B when the display device 60 displays the left-eye images in the display area 120C. The first to sixth periods can be sequentially repeated. The display mode in FIGS. 11D-11F is similar to that in FIGS. 11A-11C and omitted here.

Figure 11G:
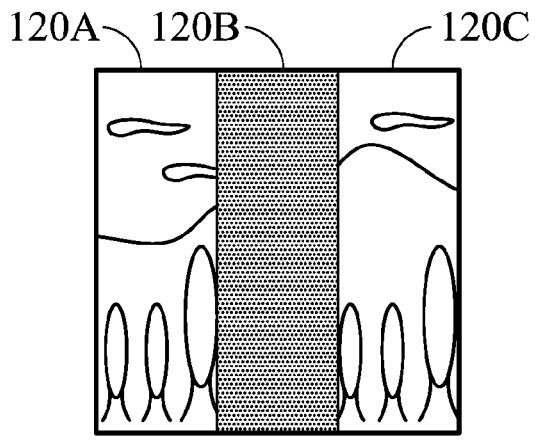
Figure 11H:
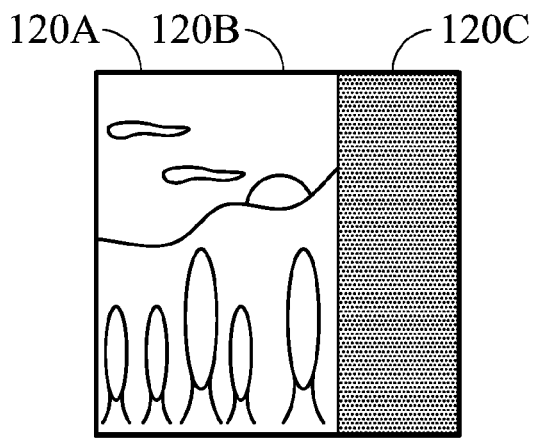
Figure 11I:
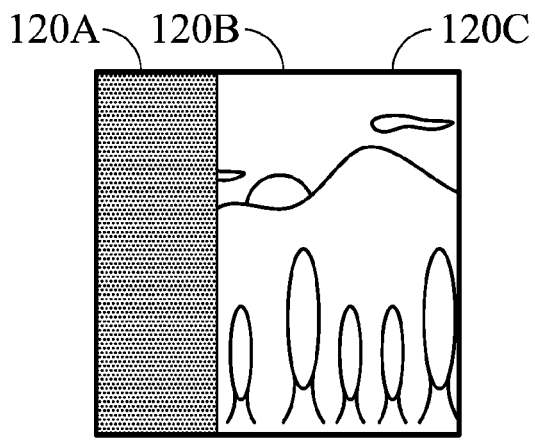
Figure 11J:
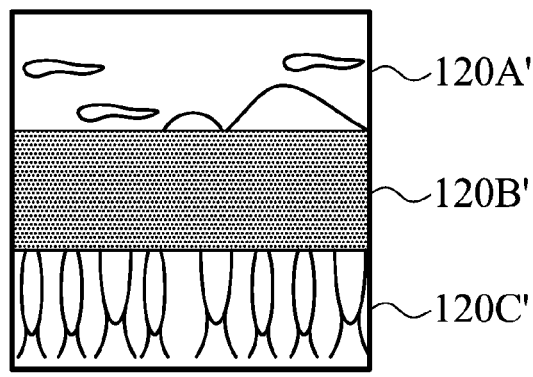
Figure 11K:
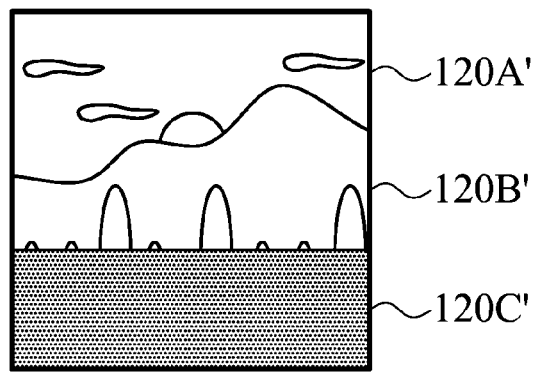
Figure 11L:
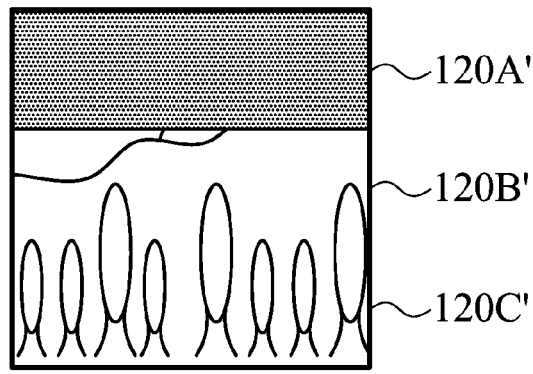

In another embodiment, during a first period, the display device 60 displays a black frame in the display area 120B when the display device 60 displays the right-eye images in the display areas 120A and 120C. During the second period, the display device 60 displays a black frame in the display area 120C when the display device 60 displays the right-eye images in the display areas 120A and 120B. During the third period, the display device 60 displays a black frame in the display area 120A when the display device 60 displays the right-eye images in the display areas 120B and 120C. During the fourth period, the display device 60 displays a black frame in the display area 120B when the display device 60 displays the left-eye images in the display areas 120A and 120C. During the fifth period, the display device 60 displays a black frame in the display area 120C when the display device 60 displays the left-eye images in the display areas 120A and 120B. During the sixth period, the display device 60 displays a black frame in the display area 120A when the display device 60 displays the left-eye images in the display areas 120B and 120C. The first to sixth periods can be sequentially repeated. The display mode in FIGS. 11J-11L is similar to that in FIGS. 11G-11I and omitted here.

When the display device 60 is a self-illumination device as shown in FIG. 7, the self illumination device can be divided into a plurality of set of units corresponding to the display areas 120A, 120B, and 120C (or 120A', 120B, and 120C'). The step of sequentially inserting the black frame as shown in FIGS. 11A-11L can be sequentially switching off different set of units of the self-illumination device in different periods, respectively.

When the display device 60 is collocated with a backlight unit 10 as shown in FIG. 8, the backlight units can be divided into a plurality of set of units corresponding to the display areas 120A, 120B, and 120C (or 120A', 120B, and 120C'). The step of sequentially inserting the black frame as shown in FIGS. 11A-11L can be sequentially switching off different set of backlight units 10 in different periods, respectively.

When the display device 60 is collocated with a side light source 1 as shown in FIGS. 3A-3C, 4A, 5A, and 6A, the side light source 1 can be divided into a plurality of set of units corresponding to the display areas 120A, 120B, and 120C (or 120A', 120B, and 120C'). The step of sequentially inserting the black frame as shown in FIGS. 11A-11L can be sequentially switching off different sets of side light sources 1 in different periods, respectively.

Figure 12A:
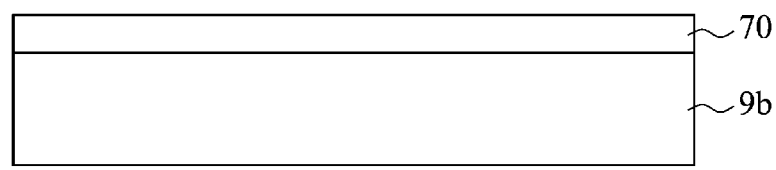
FIGS. 12A-12D show a method of forming spacers in one embodiment of the disclosure.
Figure 12B:
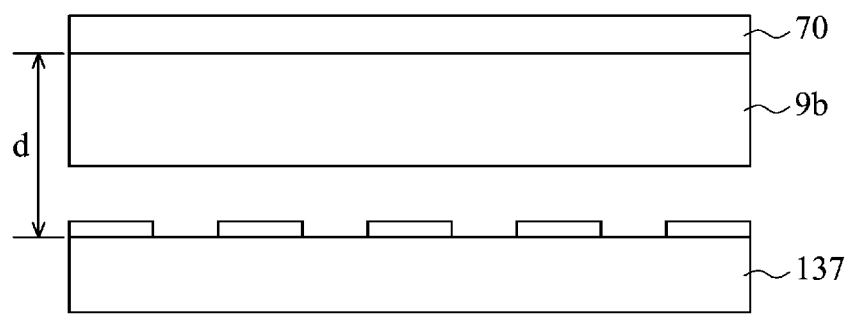

In FIGS. 4B and 5B, the light modulating device 6 includes a plurality of electronically switchable light modulating cells 63 separated by the spacers 7. The spacers 7 can be formed by the following steps. As shown in FIG. 12A, a spacer material layer 70 is formed on a top substrate 9b. In one embodiment, the spacer material layer 70 can be a positive photoresist or a negative photoresist. The spacer material layer 70 may have a thickness of 20 μm to 500 μm. An overly thick spacer material layer 70 may be toppling or peeling during process, and an overly thin spacer material layer 70 may cause defect so that some feature of the invention can not be achieved. The top substrate 9b can be made of transparent and rigid or flexible material such as glass, or plastic. The substrate 9b may have a thickness in a range from 20 μm to 1000 μm. An overly thick substrate 9b may also affect the optical transparency, and an overly thin substrate 9b may be easily broken during handling the top substrate 9b. For example, the step of forming the spacer material layer 70 on the substrate 9b can be a roll-to-roll process As shown in FIG. 12B, a photomask 137 is provided, and the distance d between the spacer material layer 70 and the photomask 137 is properly adjusted because an overly long distance between the top substrate 9b and the photomask 137 may cause out of focus. In one embodiment, the distance between the top substrate 9b and the photomask 137 is in a range from 0 μm to 2000 μm.

Figure 12C:
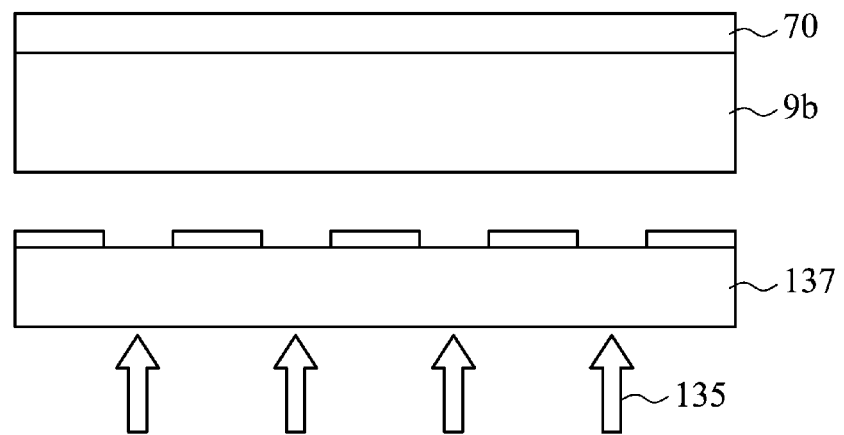
Figure 12D:
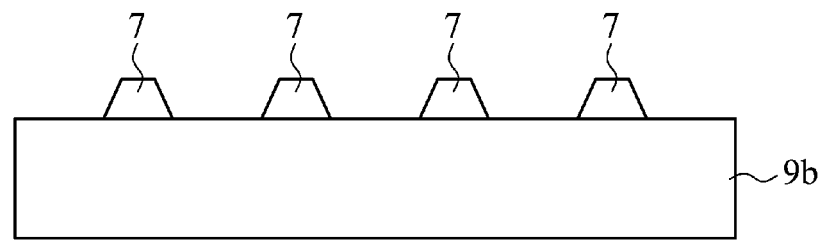

As shown in FIG. 12C, the exposure source emits light beams 135 such as UV light which travels through the pattern of the photomask 137 and the top substrate 9b so that the spacer material layer 70 is exposed. During the exposure process shown FIG. 12C, the concentration of reactive gas is also properly controlled, and in this embodiment, the reactive gas is $O_2$ gas but not limited to. The $O_2$ concentration can be enhanced by pumping $O_2$, or reduced by pumping $N_2$. If the reactive gas $O_2$ has a higher concentration, the sidewalls of the spacers 7 will have a higher tilt degree. If the reactive gas $O_2$ has a lower concentration, the sidewalls of the spacers 7 will have a lower tilt degree or even be vertical to the top substrate 9b. As shown in FIG. 12D, the spacer material layers 70 is exposed and developed to form the spacers 7 of the electronically switchable light modulating cell 63. Thus, the method for forming the spacer 7 is completed. In a further embodiment, the photomask 137 can be a gradient photomask to make the sidewall of the spacers 7 tilted.

In one embodiment, a dielectric layer (not shown) can be further formed on the spacers 7 by chemical vapor deposition (CVD), physical vapor deposition (PVD), plasma polymerization, or print. When plasma polymerization is adopted to form the dielectric layer, the dielectric layer should have a dielectric constant greater than 1. The polymerization unit of the dielectric layer may include a hydrocarbon containing silicon, phenyl group, or combinations thereof. The silicon-containing polymerization unit can be silane, siloxane, silazane, carbosilane, cyclosilane, or combinations thereof. The silicon-containing polymerization unit can be substituted by hydrogen, alkyl group, alkoxyl group, alkenyl group, phenyl group, or combinations thereof. The alkyl group, alkoxyl group, or alkenyl group may have a carbon number of 1 to 6.

The phenyl-containing polymerization unit can be xylene series, wherein the phenyl group thereof can be substituted by chlorine, bromine, alkyl group, alkoxyl group, alkenyl group, or combinations thereof. The alkyl group, alkoxyl group, or alkenyl group may have a carbon number of 1 to 6. In addition, the polymerization unit can be substituted by at least one fluorine to be hydrophobic.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for displaying stereoscopic images associated with an image display system comprising a display device and a light modulating device disposed adjacent to the display device, wherein the display device alternately displays a right-eye image during a first period and a left-eye image during a second period, comprising:
    controlling the light modulating device to spatially or angularly deflect light beams associated with the right-eye image to the right eye of a viewer during the first period and to spatially or angularly deflect light beams associated with the left-eye image to the left eye of the viewer during the second period; and
    inserting a black frame during the transition from a right-eye image to a left-eye image.

2. The method of claim 1, wherein the display device comprises a self-illumination device, and the step of inserting the black frame comprises switching off the self-illumination device.

3. The method of claim 1, wherein the display device comprises a backlight unit, and the step of inserting the black frame comprises switching off the backlight unit.

4. The method of claim 1, wherein the step of inserting the black frame comprises tuning the light modulating device to effectively block out the light beams associated with the right-eye and left-eye images, respectively.

5. A method for displaying stereoscopic images associated with an image display system comprising a display device and a light modulating device disposed adjacent to the display device, wherein the display device has a first display area and a second display area, comprising:
    controlling the light modulating device to spatially or angularly deflect light beams associated with right-eye images to the right eye of a viewer and to spatially or angularly deflect light beams associated with left-eye images to the left eye of the viewer;
    during a first period, displaying by the display device a black frame in the first display area when the display device displays the right-eye or left-eye images in the second display area;
    during a second period, displaying by the display device a black frame in the second display area when the display device displays the right-eye or left-eye images in the first display area; and
    inserting a black frame during the transition from right-eye images to left-eye images.

6. The method of claim 5, wherein the display device comprises a self-illumination device having a first set of units and a second set of units, wherein the first set of units corresponding to the first display area are switched off during the first period, and the second set of units corresponding to the second display area are switched off during the second period.

7. The method of claim 5, wherein the display device comprises one or more backlight units, the backlight unit corresponding to the first display area is switched off during the first period, and the backlight unit corresponding to the second display area is switched off during the second period.

8. The method of claim 5, wherein the light modulating device comprises an electro-wetting device or an elastic active polymer.

* * * * *